United States Patent
Mackay et al.

(10) Patent No.: US 8,637,717 B2
(45) Date of Patent: Jan. 28, 2014

(54) PRODUCTION OF DISTILLATE FUELS FROM AN INTEGRATED MUNICIPAL SOLID WASTE/TRIGLYCERIDE CONVERSION PROCESS

(75) Inventors: Ian S. Mackay, Eden Praire, MN (US); Juan F. Pearcy Salinas, Concepeion (CL)

(73) Assignee: Rational Energies, LLC, Bloomington, MN (US)

( * ) Notice: Subject to any disclaimer, the term of this patent is extended or adjusted under 35 U.S.C. 154(b) by 785 days.

(21) Appl. No.: 12/876,047

(22) Filed: Sep. 3, 2010

(65) Prior Publication Data

US 2011/0113676 A1 May 19, 2011

Related U.S. Application Data

(60) Provisional application No. 61/275,991, filed on Sep. 4, 2009.

(51) Int. Cl.
*C07C 1/00* (2006.01)
*C07C 27/00* (2006.01)

(52) U.S. Cl.
USPC .......... 585/240; 44/605; 518/706; 518/714; 518/715

(58) Field of Classification Search
USPC ............. 585/240, 242; 518/706, 714, 715; 44/605, 308
See application file for complete search history.

(56) References Cited

U.S. PATENT DOCUMENTS

| | | | |
|---|---|---|---|
| 7,838,272 B2 * | 11/2010 | Miller | 435/167 |
| 8,076,122 B2 * | 12/2011 | O'Rear | 435/262.5 |
| 8,324,413 B2 * | 12/2012 | O'Rear | 554/168 |
| 8,361,172 B2 * | 1/2013 | O'Rear | 44/308 |

* cited by examiner

*Primary Examiner* — Nina Bhat
(74) *Attorney, Agent, or Firm* — Henry E. Naylor

(57) ABSTRACT

A municipal solid waste material is converted to a refuse derived fuel then to syngas which is processed to produce a liquid feedstream via Fischer-Tropsch Synthesis. The Fischer-Tropsch liquid feedstream is combined with a triglyceride feedstream then hydroprocessed to produce a distillate fuel end product.

17 Claims, 2 Drawing Sheets

PRODUCTION OF DISTILLATE FUELS FROM AN INTEGRATED MUNICIPAL SOLID WASTE/TRIGLYCERIDE CONVERSION PROCESS

This application claims benefit of Provisional Application U.S. Ser. No. 61/275,991 filed on Sep. 4, 2009

FIELD OF THE INVENTION

The present invention relates to a process wherein a municipal solid waste material is converted to a refuse derived fuel then to syngas which is processed to produce a liquid feedstream via Fischer-Tropsch Synthesis. The Fischer-Tropsch liquid feedstream is combined with a triglyceride feedstream then hydroprocessed to produce a distillate fuel end product.

BACKGROUND OF THE INVENTION

Renewable resources such as biomass, municipal solid waste (MSW) and triglycerides derived from plants and animals can be used to produce distillate transportation fuels such as a diesel fuel and jet fuel. There is significant art associated with the use of biomass, MSW and renewable fats and oils as feedstocks for producing various high value chemicals and transportation fuels. Conventional processing routes for cellulose based materials typically include gasification and subsequent conversion to targeted chemicals or transportation fuels using conventional technologies, such as Fischer-Tropsch synthesis associated with syngas conversion to liquids. In order to produce a finished product, additional process steps, such as hydroprocessing, must be performed. Consequently, a biomass conversion facility needs to be designed much like a petroleum refinery, or complex chemical plant, that includes processing steps that optimize the quality of the desired end products.

Municipal solid waste conversion plants must be substantially smaller than conventional petroleum refineries because of the nature of the feed. Transporting municipal solid waste over distances greater than about 40 to 50 miles adds excessive cost, unless a specialized network (i.e. rail) is available. Furthermore, these smaller plants (<2000 tons per day) are less efficient and subject to supply disruptions because of fluctuations in local availability of feed.

Further, the gasification of refuse derived fuel to produce a synthesis gas that is acceptable for the production of commodity chemicals or transportation fuels is challenging. Typical biomass and MSW gasifiers available today operate in a non-slagging mode that limits their operating temperature to less than about 2000° F. However, because cellulose-based materials undergo soot formation reactions associated with pyrolysis, operations at elevated temperatures, or high steam levels, is desirable. Elevated temperatures (>2000° F.) help prevent soot formation but can lead to other problems associated with slagging and the vaporization of the inorganic constituents in the cellulose feed matrix. One method to eliminate excessive soot formation is to operate at higher steam to carbon feed ratios. The higher steam levels help mitigate soot formation but has the disadvantage of producing a syngas containing a higher $H_2/CO$ ratio than is typically desired for the production of most commodity chemicals and transportation fuels, such as methanol and distillate fuels, such as diesel and jet fuels.

The conversion of triglycerides to diesel and jet fuel is also known in the art. The mass yield of representative triglyceride feeds to diesel fuel is generally about 60% or less and the yield to jet fuel product is lower. These relatively low yields are partly due to the inherent inefficiencies associated with converting the n-alkanes derived from triglycerides (typically C16 to C22) into isomerized, or branched, alkanes having the carbon number range of the targeted products. The conversion of Fischer-Tropsch liquids into diesel and jet fuel products is also known in the art. Typical yields are in the range of about 70-80% for diesel and about 55-70% for jet fuel.

Product efficiency and overall thermal efficiency of a biomass to liquids conversion facility is strongly dependent upon site location. For example, facilities that are adjacent to high users of heat energy have the advantage of being able to export by-product energy. This export energy increases the overall efficiency and economics of the facility. Facilities that cannot export energy have lower efficiencies and thus must improve the overall economic viability of the plant in other ways. Consequently, there is a need in the art for ways to increase the overall economic viability of biomass facilities that have no opportunity to export energy.

There is also a need in the art for cost effective processes for producing transportation fuels from biomass feeds, such as triglycerides and municipal solid waste.

SUMMARY OF THE INVENTION

In accordance with the present invention, there is provided an integrated process for producing distillate transportation fuels from municipal solid waste and triglycerides, which process comprising:
  a) feeding a municipal solid waste stream comprised of inorganic material, organic material, and water to a treatment zone wherein it is converted to a refuse derived fuel by removing at least a portion of the inorganic material;
  b) conducting at least a portion of the refuse derived fuel to a drying zone wherein the level of water is adjusted to a level that will produce a syngas having a $H_2$ to CO ratio of about 2.0 to about 2.6 when the refuse derived fuel is gasified, and at least one contaminant;
  c) gasifying said refuse derived fuel to produce a syngas containing particulates and having a $H_2$ content and a CO content wherein the ratio of $H_2$ to CO is about 2.0 to about 2.6;
  d) treating said syngas to remove at least a portion of any particulates and at least one contaminant selected from the group consisting of $H_2S$, COS, HCl, $NH_3$, HCN, and Hg, thereby resulting in a cleaned syngas;
  e) passing said cleaned syngas to a hydrogen recovery zone wherein hydrogen in excess of the amount needed for downstream Fischer-Tropsch synthesis is removed, thereby resulting in a hydrogen depleted syngas stream;
  f) passing at least a portion of said hydrogen depleted syngas stream to a Fischer-Tropsch synthesis zone wherein it is reacted under Fischer-Tropsch reaction conditions and in the presence of a Fischer-Tropsch catalyst to produce a vapor phase stream, a light liquid stream comprised predominantly of hydrocarbons the carbon range of about C5 to about C20, and a heavy liquid stream comprised predominantly of hydrocarbons in the carbon range of about C8 to about C20+;
  g) separating the vapor stream from the liquid streams;
  h) combining said light liquid stream with a triglyceride stream and passing the combined stream to a hydrotreating zone wherein it is subjected to hydrotreating conditions in the presence of a hydrotreating catalyst to produce a hydrotreated liquid hydrocarbon stream substantially free of oxygenates and unsaturated bonds;

i) passing the hydrotreated stream to a hydroisomerization zone wherein it is subjected to hydroisomerization conditions in the presence of an hydroisomerization catalyst thereby resulting in an isomerized hydrotreated stream containing substantially more branched compounds than the hydrotreated stream before hydroisomerization;

j) passing said heavy Fischer-Tropsch liquid stream from the synthesis zone to a hydrocracking zone wherein it is subjected to hydrocracking conditions in the presence of a hydrocracking catalyst, to produce a lower boiling product stream boiling primarily in the distillate boiling range;

k) co-feeding the product streams from the hydrocracking zone and the hydroisomerization zone into a common fractionating zone, to produce at least two predetermined fractions one of which is a distillate boiling range transportation fuel stream.

DETAILED DESCRIPTION OF THE INVENTION

Figure 1:
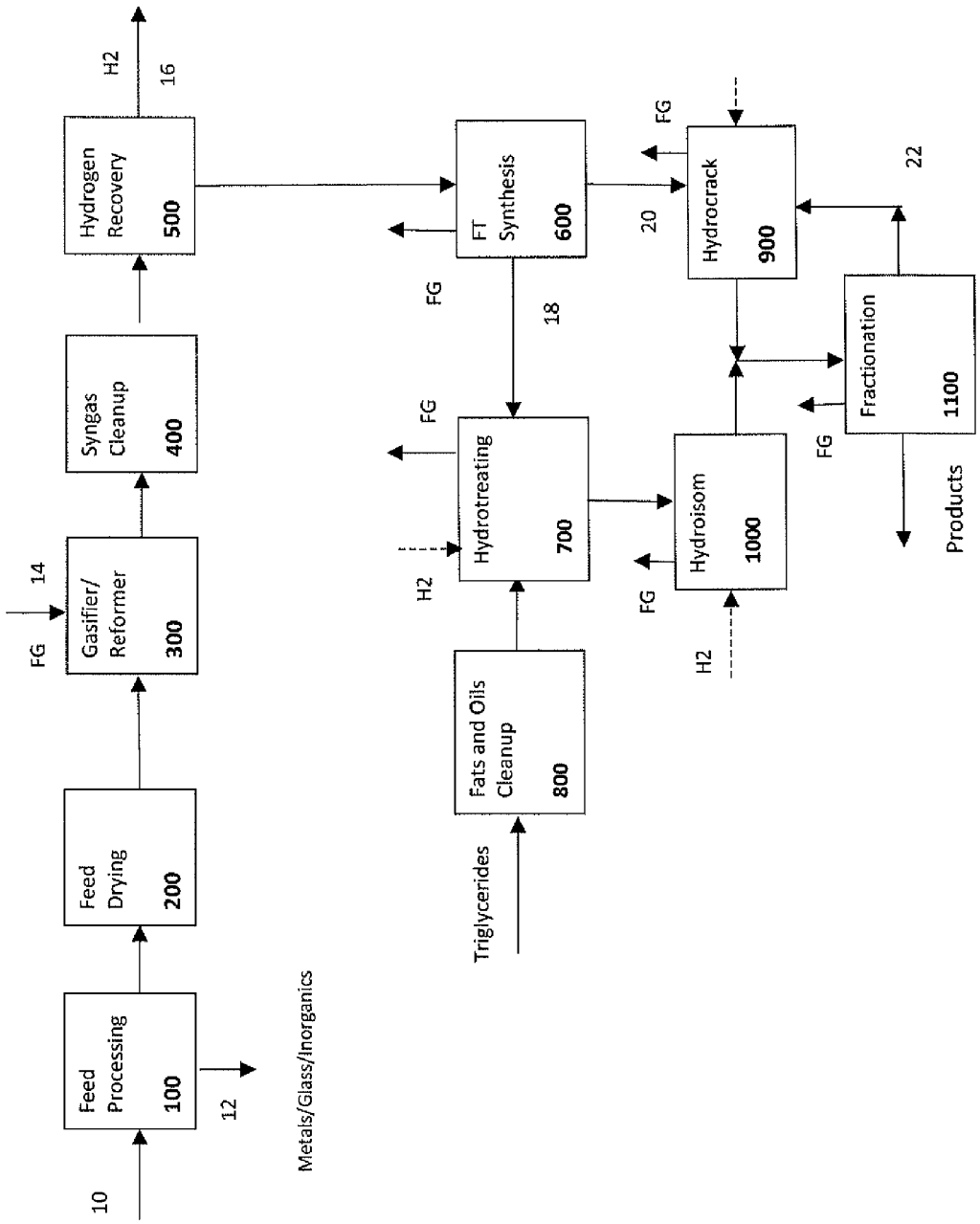
FIG. 1 hereof is a block diagram of a preferred process scheme of the present invention.

The present invention relates to a novel integration that allows a gasifer to operate at conditions that enhance operability with respect to handling a variety of biomass materials while improving the efficiency of the process. The present invention also relates to a novel method for unexpectedly increasing the overall yield of the conversion of triglycerides to transportation fuel through the combined processing of Fischer-Tropsch liquids and triglycerides within the same process. The combined feed can be converted into several product streams. One product stream is comprised of hydrocarbons having a carbon numbers range of about C5 to C20. Another product stream is comprised of hydrocarbons in the C8 to C20+ range, with the majority being in the C20+ range. The C5 to C20 hydrocarbon stream is hydrotreated to remove oxygenates and to saturate at least a portion of the unsaturated bonds of olefinic components of the stream. The stream is then hydroisomerized to a desired level of branching. The heavy Fischer-Tropsch liquids stream, comprised primarily of C8 to C20+ hydrocarbons is separately hydrocracked to provide lighter material that is necessary for product requirements. Thus, a minimal amount of the C18 alkanes derived from the triglycerides will need to be cracked in order to satisfy the product requirements. Hydrocracking is necessary to convert the higher carbon number paraffins (C20+) to the desired carbon number range for diesel and jet fuel, which is nominally about C5 to about C20. Hydroisomerization is also used to provide the required cloud point for both the IFO derived alkanes and the light Fischer-Tropsch liquid fractions of the fuel.

An important property of both diesel and jet fuels is the cloud point that can typically be as low as about −30° F. for diesel in northern areas and about −60° F. for jet fuel. In order to achieve these cloud points, the product must contain a significant amount of isomerized product where >15% of the total carbon is branched from straight chain paraffins. The presence of straight chain paraffins alone will not achieve a low cloud point. Further, the presence of long straight chain paraffins (>C12) will significantly raise the cloud point to greater than about 0° F. In order to achieve the desired cloud points, and considering that diesel must contain a carbon number distribution encompassing the C8 to C20 range, whereas jet fuel should contain a carbon number distribution encompassing the C9 to C16 carbon numbers, the extent of isomerization must be significant. Isomerization of linear paraffins into branched molecules with the same carbon number results in a significant decrease in boiling point. This allows for a higher percentage of higher carbon number fractions to become part of the final fuel blend, while meeting end point distillation specifications.

Yield losses to undesired co-products, such as naphtha and light ends, are significantly higher during hydrocracking than for hydroisomerization and hydrotreating. The cracking process involves the random splitting of hydrocarbons with C3 being the predominant smallest fragment. The cracking of C18 to C20+ alkanes into the C5 to C20 range thus involves significant yield losses due to secondary cracking. Consequently, diesel and jet fuel yields from triglycerides are fairly low (40-60%) due to the inefficiencies of converting chain lengths that are near the upper limit of the product range (C18 to C22) into diesel or jet fuel carbon number range.

Fischer-Tropsch liquids produced by cobalt catalyst synthesis contain carbon number fractions both within and above the desired product range. Consequently, Fischer-Tropsch liquids are preferably processed so that only the longer chains undergo cracking. The smaller chains can be isomerized without yield loss associated with cracking.

Diesel and jet fuel products must meet certain specifications (such as the specifications for JP-8 jet fuel or D-975 diesel fuel) that dictate the boiling endpoint for the particular fuel. D975 diesel fuel refers to a petroleum fraction containing primarily C10-C24 hydrocarbons and having distillation temperatures of about 160° C. at the 10% recovery point and about 340° C. at the 90% recovery point. JP-8 is a kerosene-based jet fuel specified in 1990 by the U.S. Government as a replacement for JP-4 jet fuel. A target boiling range endpoint generally controls the amount of heavier constituents, as well as the degree of branching or isomerization, which in turn also determines the resulting cloud point for the fuel product. As previously mentioned, the cloud point is usually achieved by increasing the extent of isomerization, but it is also influenced by the carbon number distribution, and the corresponding distillation footprint of the fuel. For example, the production of D-975 diesel with a cloud point of −10° F. will require a lesser extent of isomerization compared to requiring a cloud point of −30° F. The complex interrelationship between synthetic distillate fuel properties and the degree of isomerization and cracking of the two renewable feedstocks of the present invention creates an unexpected opportunity for the development of a unique, integrated and synergic process that allows for fuel specifications while minimizing yield losses due to degradation to lower value by-products.

The endpoint for diesel can vary somewhat and can contain a small amount of hydrocarbons as high as C20+. The fraction of lighter hydrocarbons in a distillate fuel, such as diesel and jet fuel, is established by the flash point (typically about 125° F.) so the lightest hydrocarbon is typically in the C8 range. JP-8 jet fuel has a well defined boiling point range but can be represented as containing a nominal carbon ranging from C9 to C16.

As used herein, "municipal solid waste" (MSW) refers generally to solid waste usually collected as part of a municipal garbage collection system and typically includes, in combination, household wastes, food wastes, lawn wastes, and office generated waste. It may also include various amounts of industrial generated wastes and scrap material. The term, municipal solid waste, as used herein also includes mixed wastes, such as typical unseparated household waste and source separated wastes such as organics generated by sewage treatment plants and food wastes generated by restaurants and some food processing facilities. Thus, depending on the source, MSW may have components similar to agricultural waste.

It is within the scope of this invention that municipal sewage sludge (MSS) can be used as the feedstock, either with MSW or alone. Municipal sewage sludge, as used herein, refers to the slurry left behind in a sewage treatment plant after its load of human and industrial chemical wastes have been bio-chemically treated and the wastewater discharged. Sewage sludge often comprises organic materials composed mainly of crude proteins, lipids and carbohydrates, and inorganic materials, comprising significant quantities of silt, grit, clay and lower levels of heavy metals.

The biomass feedstocks of the present invention will be gasified to produce syngas. The production of syngas containing excess hydrogen adds additional flexibility to the overall process scheme of the present invention by allowing the use of different gasifier systems utilizing either indirect or direct heating. Syngas, also sometimes referred to herein by synthesis gas, is a mixture that includes both hydrogen and carbon monoxide. In addition to these species, water, carbon dioxide, unconverted light hydrocarbon feedstock and various impurities may also be present. Non-limiting examples of such impurities include $H_2S$, COS, HCl, $NH_3$, HCN, and Hg.

Any type of gasifier can be used in the practice of the present invention as long as it is capable of efficiently gasifying the refuse derived fuel feedstocks of the present invention into a syngas containing $H_2$ to CO at a ratio from about 2.0 to about 2.6. Non-limiting types of gasifiers that can be used in the practice of the present invention include up-draught (counter current) gasifiers, downdraught (co-current) gasifiers, cross-draught gasifiers, fluidized bed gasifiers, plasma gasifiers, double fired gasifiers, entrained bed gasifiers and molten bed gasifiers. Fluidized bed gasifiers are preferred.

FIG. 1 hereof is a block flow diagram of one preferred embodiment of the present invention wherein a MSW feed is converted to refuse derived fuel (RDF) which is then subjected to gasification to produce syngas. The syngas is converted by Fischer-Tropsch synthesis to liquids that are combined with triglycerides and hydroprocessed to produce a high value distillate fuel end product. The gasification process may include reforming reactions that convert hydrocarbons, either separately fed with the feed material or produced as intermediates or by-products in the primary gasification reactions. The hydrocarbons (such as light alkanes or alkane-containing compounds), are converted to syngas either thermally or in conjunction with a catalytic component during gasification. The designation of a gasifier/reformer process incorporates the combined processes of converting cellulosic material, such as MSW, into syngas. In accordance with FIG. 1 hereof, a MSW feed is conducted, via line 10, to feed processing zone 100 where it is comminuted and processed to remove non-organic components such as glass and metals, which can be collected via line 12. Metals typically makeup about 5 wt. % of a MSW feed. The remaining organic portion, which is primarily comprised of paper, plastics and other organic material, is referred to as refuse derived fuel and is passed to drying zone 200 where its moisture level is adjusted to a level adequate to achieve the desired $H_2$/CO syngas ratio in the gasification zone. Preferred moisture levels will generally be in the range of about 5 to 20 wt. %, more preferably from about 9 to 12 wt. %, but the moisture level can vary depending on the feed requirements of the gasifier, which is preferably indirectly heated. A gasifier operated at temperatures of about 1800° F. can accept higher moisture levels, as can a plasma gasifier.

The dried feed is passed to gasification step 300. As previously mentioned, any suitable gasification system can be used in the practice of the present invention as long as it is capable of converting the refuse derived fuel to a syngas having the desired ratio of gases, particularly $H_2$ and CO. A preferred configuration is indirect heating using fuel gas recovered from the synthesis process and indicated as line 14. All biomass gasifier systems of the present invention will involve the combination of steam, biomass (in this case RDF) and heat to produce the desired syngas composition. As previously mentioned, the desired syngas composition exiting gasification step 300 will have a preferred $H_2$ to CO ratio from about 2.0 to about 2.6.

Gasification is a combination of reactions involving the reaction with steam, decomposition of cellulose and other intermediate hydrocarbons (pyrolysis). Reforming is the conversion of alkanes (i.e. methane or higher alkanes) into synthesis gas. In the gasification step, the RDF also undergoes pyrolysis, and in the combined reaction matrix, light alkanes are produced. These light alkanes can be further converted to synthesis gas as part of the gasification process, however when a catalyst is used to enhance these reactions it is often referred to as reforming. The device which produces the syngas can either be a gasifier only, or a gasifier that also includes a catalytic reforming component. The reforming component can be part of the gasifier, or it can be a separate entity integrated with the syngas generation steps. Also, the addition of oxygen for a directly heated system adds partial oxidation to the reaction matrix. Thus, for purposes of this invention the term "gasification" will include both gasification alone and gasification in combination with reforming.

The generation of excess hydrogen is sometimes considered detrimental to overall process efficiency, except when producing products such as Fischer-Tropsch liquids that require hydroprocessing to produce transportation fuels, lubricants, or waxes which meet the same product specifications as that derived from crude oil. The incremental cost required to produce the hydrogen required to meet existing product specifications is relatively small compared to the cost associated with securing the required hydrogen from an external source. The production of sufficient excess hydrogen in the process of the present invention allows for the use of renewable fats and oils (triglyceride based feed) in a downstream hydroprocessing stage.

The syngas produced in gasification zone 300 is sent to syngas cleanup step 400 that preferably comprises several operations designed to remove solids, such as tar and ash, and unwanted constituents such as chlorine, sulfur, nitrogen compounds, mercury, lead as well as other material that can act as a poison to any downstream catalytic processes. Syngas cleanup technology is well developed in the art and the specific selection depends upon the type and amount of material that needs to be removed. For example, water scrubbing can be used to remove fine solids that are present in the syngas. venturi contactors, or similar devices are effective in removing solids. Acidic gases containing sulfur, nitrogen and chlorine can be removed either directly or indirectly. In a direct syngas clean-up process scrubbers fed with a suitable sorbant, such as a sodium carbonate solution, are typically a first step aimed at the removal of an acid contaminant, such as hydrogen chloride. Weak bases, such sodium carbonate are preferred over strong bases, such as caustics (NaOH). This is because a caustic will not only absorb HCl, but also some $CO_2$ and $H_2S$. Absorbing $CO_2$ is expensive because a large amount of caustic will be consumed. Further, absorbing $H_2S$ with caustic will result in undesirable products such as NaHS and $Na_2S$, both of which are known to be hazardous materials as they decompose in the presence of acids to produce $H_2S$. On the other hand, a weak base such as sodium carbonate has sufficient strength to neutralize strong acid gases, but not enough strength to substantially react with $CO_2$ and $H_2S$ and thus it will not interfere with the objects of the instant process.

Also, basic constituents such as ammonia may need separate scrubbing with either water or a mildly acidic solution. There are a number of commercial processes that are applicable to syngas $H_2S$ removal, particularly those that are based on redox reactions or biological technologies. These processes have the advantage of enabling the fixation of sulfur contaminants as innocuous and highly stable elemental sulfur. To warrant quantitative removal of sulfur and nitrogen compounds, it is also common practice that a catalyst bed such as Co—Mo be used for hydrogenating and/or hydrolyzing trace components such as COS, HCN and $CS_2$. They are then converted to removable species such as $H_2S$ and $NH_3$. Trace metals, either as part of the solids or in a gaseous state, can be removed by scrubbing or the use of solid absorbent beds such as activated carbon. The syngas clean-up process will typically include guard beds for capturing residual halides. The guard beds will typically be comprised of a ZnO particulate bed. It is recognized that the syngas feed to the Fischer-Tropsch synthesis section must be substantially free of Cl, S, N and heavy metal contaminants. By substantially free we mean to a level of about 500 parts per billion or less.

The syngas clean-up process can also be carried out in an indirect way, such as by means of a physical absorption step capable of quantitatively removing all acid and polar contaminants, including $CO_2$, concentrating them into a $CO_2$ rich tail gas stream and a cleaned syngas stream. One such process is based upon cryogenic methanol absorption, of which the commercial RECTISOL syngas clean-up technology is an example. In such processes, the syngas is subject to two or more stages of scrubbing with methanol, at increasingly lower temperatures, typically having a final absorption stage taking place at a temperature of about −70° to about −90° F., and a pressure of about 450 to about 600 psig. The advantage of an indirect syngas clean-up process is that it enables: i) the increase in partial pressures of $H_2$ and CO in the syngas; ii) the reduction of the volume of syngas to Fischer-Tropsch as fewer inerts will be present; and iii) the production of a final tail-gas having a higher heating value.

The resulting tail gas in an indirect syngas cleanup process can then subjected to processing for the removal of HCl, $H_2S$ and using similar processes to those applicable for the previously mentioned direct processing scheme. Advantages resulting for treating a tail gas instead of the total syngas stream, stem from the fact that a significantly reduced volume of gas has to be cleaned. It is also an advantage that a broader range of technologies can be applied can be used, which includes oxidation based processes, such as Claus technology.

The syngas stream, after cleanup, is sent to hydrogen recovery step 500 wherein hydrogen required for downstream hydroprocessing is removed via line 16 prior to being passed to Fischer-Tropsch Synthesis step 600. $H_2$ recovery step 500 is also used to lower the $H_2/CO$ ratio in the feed for Fischer-Tropsch Synthesis 600. Pressure swing adsorption is preferred method for recovering $H_2$ since it is well established commercially.

The cleaned and hydrogen depleted syngas stream is then sent to Fischer-Tropsch Synthesis step 600 where it is converted at conditions that will optimize the production of $C_8+$ liquids. Such conditions will include temperatures from about 380° to about 440° F., preferably from about 390° to 430° F. and total pressures of about 350 to about 550 psig, preferably from about 400 to about 450 psig. Fischer-Tropsch synthesis involves the conversion of the $H_2$ and CO into primarily liquid alkanes ranging from C5 to C100+. Preferred Fischer-Tropsch operating conditions will depend on the specific catalyst selected as well as the reactor type. A fixed bed reactor is preferred for a relatively small plant (<5000 bpd) due to the logistics and availability of the feedstock. The preferred Fischer-Tropsch products are produced at lower $H_2/CO$ ratios (<2/1), in order to increase the mean molecular weight of the product and also to limit methane selectivity.

The preferred ratio of $H_2/CO$ to Fischer-Tropsch synthesis step 600 will be dependent upon a number of factors, including but not limited to, the desired product slate, the extent of CO conversion, as well as the operating conditions and performance characteristics of the Fischer-Tropsch catalyst. In one scenario, a multi-stage Fischer-Tropsch process (not shown) is used in which the feed to all stages is below the stoichiometric consumption ratio associated with the desired products. The preferred $H_2/CO$ ratio for the feed gas to the Fischer-Tropsch reactor is at or below the stoichiometric consumption ratio. When the feed ratio is equal to the consumption ratio, it is possible to achieve high CO conversions since neither of the feed constituents is limiting. The use of this lower ratio enhances the product slate towards heavier, more valuable hydrocarbons suitable for diesel, lubricants and paraffinic waxes. Decreasing the $H_2/CO$ feed ratio limits the overall CO conversion since $H_2$ becomes limiting. In order to increase CO conversion while maintaining a sub stoichiometric syngas feed ratio, two or more Fischer-Tropsch stages are employed. The additional one or more stages, with hydrogen addition at the inlet, permits higher CO conversion at higher syngas ratios that are still below the stoichiometric consumption and that provide a heavier product yield. For example, utilizing a $1.7H_2/CO$ ratio as the feed to a Fischer-Tropsch reactor, allows CO conversion up to a practical maximum of approximately 60-70%.

The exit ratio from the reactor is well below the stoichiometric consumption level and the partial pressure of the $H_2$ is very low. However, when utilizing a second Fischer-Tropsch reactor the effluent gas from the first reactor can be combined with $H_2$ to increase the $H_2/CO$ ratio in the feed. The preferred ratios to either a single or multistage Fischer-Tropsch system in the range of about 1.5 to about 2.1 with the preferred range of about 1.6 to about 1.8. Operations at lower ratios lead to lower overall CO conversion. Another advantage of a multi-stage Fischer-Tropsch system is to use different ratios for each of the stages in order to maximize the desired product yield while achieving higher overall CO conversions. A variation of this first scenario based upon two Fischer-Tropsch reaction stages may incorporate a shift reactor in between the first and second stages, to convert part of the $CO_2$ present in the syngas leaving the first Fischer-Tropsch reaction stage into CO, in accordance with the overall hydrogen availability and energy balance of the plant. This variation permits high conversion of the syngas, as well as an improved control of the composition of the gas entering the second Fischer-Tropsch reaction stage.

In another scenario, the present invention also considers a single stage Fischer-Tropsch reactor is used with partial recycle of the tail gas to attain similar objectives in terms of product slate and overall conversion of CO.

The recovered $H_2$ can be used in several downstream process steps of the instant overall process, as indicated in this FIG. 1 hereof. For example, when two or more Fischer-Tropsch synthesis stages are used, the preferred syngas ratio of $H_2$ to CO is less than about 2.1, preferably from about 1.5 to 2.1 depending on the catalyst and operating conditions, as well as the desired product yields. In the novel configuration presented in FIG. 1 hereof, the $H_2$ recovered in $H_2$ Recovery step 500 can be used to provide make-up hydrogen to a second Fischer-Tropsch step (not shown). The primary function of the recovered hydrogen is to use it as hydrogen treat-gas to the hydrotreating step for hydrotreating the Fischer-Tropsch liquids/triglycerides stream, which hydrotreating step 700 will be discussed below.

Fischer-Tropsch catalysts are well known in the art and typically contain a Group 8 transition metal on a metal oxide support. The catalysts may also contain a noble metal promoter(s) and/or crystalline molecular sieves. Non-limiting examples of Group 8-10 metals are those selected from the group consisting of Fe, Ni, Co, Ru and Re, with cobalt being preferred. A preferred Fischer-Tropsch catalyst comprises effective amounts of cobalt and one or more of a metal selected from the group consisting of Re, Ru, Pt, Fe, Ni, Th, Zr, Hf, U, Mg and La on a suitable inorganic support material, preferably one which comprises one or more refractory metal oxides. In general, the amount of cobalt present in the catalyst is between about 1 to about 50 wt. % based on the total weight of the catalyst composition. The catalysts can also contain basic oxide promoters such as $ThO_2$, $La_2O_3$, MgO, $TiO_2$, and $ZrO_2$, noble metals (Pt, Pd, Ru, Rh, Os, Ir), coinage metals (Cu, Ag, Au), and other transition metals such as Fe, Mn, Ni, and Re. Non-limiting examples of support materials suitable for use herein include alumina, silica, magnesia and titania or mixtures thereof. Useful catalysts and their preparation are known and disclosed in U.S. Pat. No. 4,568,663, which is incorporated herein by reference and which is intended to be illustrative but non-limiting relative to catalyst selection.

Returning to FIG. 1 hereof, a product stream which is produced in Fischer-Tropsch synthesis step 600 is comprised of a gaseous component and a hydrocarbon liquid component having carbon numbers up to about 100 or more. Fisher-Tropsch liquids are typically comprised of predominantly straight chain paraffins with approximately about 5 to about 10 wt. % olefins and less than about 1 wt. % oxygenates, based on the total weight of the Fischer-Tropsch liquids. The gaseous component is typically comprised of methane, $CO_2$, unreacted syngas, and $C_2$ to $C_7$ hydrocarbons that can be used as local fuel gas and/or recycled to gasification step 300. The liquid component is comprised of a light hydrocarbon stream and a heavy hydrocarbon stream. The light hydrocarbon stream will be comprised predominantly of hydrocarbons in the carbon range of about C5 to about C20. Less than about 5% of the C5 to C20 fraction will have hydrocarbons in the range of C20+. A relatively large portion of this C5 to C20 portion will be in the C8+ distillate fuel range. If desired, a C5 to C7 hydrocarbon cut can be collected and sold as naphtha. The light hydrocarbon stream is conducted via line 18 to hydrotreating zone 700. The heavy hydrocarbon stream will contain hydrocarbon predominantly in the carbon range of about C8 to C20+. Greater than 75% of the C8 to C20+ fraction will have hydrocarbons in the C20+ range.

The present invention utilizes both Fischer-Tropsch liquids and renewable fats and oils (triglycerides) as the feedstock to the hydroprocessing required to produce the final specified transportation fuel, such as diesel fuel and jet fuel. The primary advantage of this integration is to capture the improvement in the thermal and product efficiency as it relates to the production of a fully specified fuel product.

No. 1 D-975 diesel typically contains hydrocarbons in the C8 to C16 carbon numbers, with limited amounts of C17+ due to the endpoint specifications of the boiling point range. This condition is significantly relaxed when targeting No. 2 D975 diesel since it is known that a very narrow carbon number distribution, or single alkane, shall not meet the fuel properties. Most natural triglycerides when subject to hydrotreating give rise to a single or very narrow alkane distribution, typically within the C16 to C22 range. It has been established that using triglycerides as the sole feed for the production of the desired C9 to C16 (JP-8) or C8 to C20 (diesel) material is not as efficient as compared to the cracking of larger molecules (C25+). The best diesel yield from a typical triglyceride feed is typically in the range of about 60 wt %. The yield is limited because of the relatively poor cracking selectivity of C16-C20 paraffins into the lighter range material required for diesel or for jet fuel.

Cracking selectivities for alkanes are essentially uniform over each internal hydrocarbon starting at the C4 position within each molecule. Consequently, when cracking a C16 molecule, there is only one position on the molecule (between the C8 and C9 carbon) that allows the full mass of the molecule to enter into the diesel product range. Higher carbon numbers (i.e. C20+) will have a greater yield towards diesel since there are several carbon positions where cracking will produce products which fall into the diesel boiling point range.

Distillate yields from Fischer-Tropsch liquids are at least about 70 wt % with some reporting as high as 85 wt %. The co-processing of both triglycerides and Fischer-Tropsch liquids surprisingly enhances the overall efficiency compared to separately processing each liquid independently. The synergism of using both feeds is based on the smaller yield loss associated with hydrocracking Fischer-Tropsch liquids to a lighter boiling point fraction required for D975 diesel or JP-8 fuel. The triglycerides do not have to undergo as much hydrocracking as required if it were the only feed. The Fischer-Tropsch liquid is hydroprocessed to provide the lighter material of the product distillate blend. Only mild hydrocracking and extensive Hydroisomerization is needed for the triglyceride material. The yield losses due to additional hydrocracking of the heavier Fischer-Tropsch materials (about C25+) is significantly less than the corresponding yield losses from the triglyceride feed (C16-C22).

Glycerides are typically aliphatic glycerides where the aliphatic groups contain between about 8 to about 30, preferably between about 16 to about 20, more preferably from about 16 to about 24 carbon atoms for most biomass sources of glycerides. Triglycerides have three such aliphatic groups, diglycerides have two such groups, and monoglycerides have one such group. The glyceride-containing biomass of the feedstock for the present invention is preferably from bio-sources, such as vegetables and animal fats. Non-limiting examples of glyceride-containing biomass suitable for use in the present invention include, but are not limited to, rape seed, soybean, cotton seed, safflower seed, castor bean, olive, coconut, palm, corn, canola, jatropha, rice bran, tobacco seed, fats and oils from animals, including from rendering plants, algae derived oils, fish oils, and yellow grease. Yellow grease is typically used-frying oils from deep fryers. The present invention is not directed to extracting oils and fats from its biomass source since such methods are well known in the art.

A suitable triglyceride feed is preferably conducted to clean-up step 800 for the removal of various contaminants present in the as received triglyceride feed. Typically, the as received triglyceride feed will contain contaminants such as alkali materials, chlorine, possibly sulfur, and dissolved water. The dissolved water retains many of the undesirable materials as dissolved salts. The free fatty acid content of the as received triglyceride feed is generally an indicator as to how much clean-up is necessary. Free fatty acids by themselves are not a serious contamination issue; however, the ability to function as emulsifying agents increases the capacity of the triglyceride matrix to retain water and the unwanted dissolved salts. Any suitable clean-up technology can be used in the practice of the present invention, but a preferred clean-up process will involve water washing to displace the dissolved salts. Additional clean-up steps can also include thermal treatment to remove water, followed by ultrafiltration. There are several commercially available clean-up technologies available and specific testing for each triglyceride feed may be necessary to select the most appropriate technology. An alternate, or additional clean-up method, which can be used involves a guard bed that preferentially absorbs the unwanted contaminants prior to passage to downstream hydroprocessing steps.

The cleaned triglyceride feed is then combined with the lighter Fischer-Tropsch liquid stream and passed to hydrotreating step 700 where they are reacted with hydrogen primarily to reduce and remove at least a portion of the oxygenate functionality present in the triglycerides and the Fischer-Tropsch liquid. Additionally, a majority of olefins are hydrogenated and oxygen-carbon bonds are broken resulting in essentially a paraffinic feed.

Hydrotreating catalysts suitable for use herein are those containing at least one Group 6 (based on the IUPAC Periodic Table having Groups 1-18) metal and at least one Groups 8-10 metal. Preferred metals include Ni, W, Mo, Co and mixtures thereof. These metals, or mixtures of metals, are typically present as oxides or sulfides on refractory metal oxide supports. The mixture of metals may also be present as bulk metal catalysts wherein the amount of metal is about 30 wt. % or greater, based on the total weight of the catalyst. It is also within the scope of this invention that the active metal for the hydrotreating catalyst be one or more noble metals selected from Pt and Pd with or without a Group 6 metal, preferably without a Group 6 metal.

Non-limiting examples of suitable metal oxide supports suitable for use herein include silica, alumina, silica-alumina, and titania. Preferred is alumina. Preferred aluminas are porous aluminas such as gamma or eta alumina. The acidity of metal oxide supports can be controlled by adding promoters and/or dopants, or by controlling the nature of the metal oxide support, e.g., by controlling the amount of silica incorporated into a silica-alumina support. Non-limiting examples of promoters and/or dopants suitable for use herein include halogen (especially fluorine), phosphorus, boron, yttria, rare-earth oxides and magnesia. Promoters, such as halogens, generally increase the acidity of metal oxide supports while mildly basic dopants, such as yttria and magnesia, tend to decrease the acidity of such supports.

Hydrotreating conditions include temperatures in the range of about 535° F. to about 750° F., preferably about 570° F. to about 715° F. at pressures in the range of about 1480 to about 20786 kPa (about 200 to about 3000 psig), preferably about 2859 to about 13891 kPa (400 to 2000 psig), a space velocity of from about 0.1 to about 10 LHSV, preferably about 0.1 to about 5 LHSV, and a hydrogen treat gas rate of from about 89 to about 1780 $m^3/m^3$ (about 500 to about 10000 scf/B), preferably about 178 to about 890 $m^3/m^3$ (about 1000 to about 5000 scf/B).

The hydrotreating reaction step 700 can be comprised of one or more fixed bed reactors, or reaction zones within a single reactor, each of which can comprise one or more catalyst beds of the same, or different, hydrotreating catalysts. Although other types of catalyst beds can be used, fixed beds are preferred. Such other types of catalyst beds suitable for use herein include fluidized beds, ebullating beds, slurry beds, and moving beds. Interstage cooling or heating between reactors or reaction zones, or between catalyst beds in the same reactor or reaction zone, can be employed since the reaction is generally exothermic. A portion of the heat generated during hydrotreating can be recovered. Where this heat recovery option is not available, conventional cooling may be performed through cooling utilities, such as cooling water or air, or through use of a hydrogen quench stream. In this manner, optimum reaction temperatures can be more easily maintained.

This hydrotreated combined stream, preferably once separated from the chemical water produced, is then conducted to hydroisomerization step 1000 where it is isomerized to improve, among other things, the cloud point characteristics. Typically for diesel, the fuel specifications require saturated hydrocarbons containing about 8 to 16 carbons with a sufficient degree of isomerization to satisfy cloud, pour and freeze points. The cloud, pour and freeze points, combined with the endpoint boiling point range (90% of the diesel fuel mixture) must boil below the maximum temperature of about 282° or about 338° C. for No. 1 or No. 2 diesel respectively according to the ASTM D-975 specifications. C16 paraffins and saturated isomers boil below any of these ranges for diesel specifications and also fit with JP-8 carbon number ranges. However the C18+ material can generally boil above about 310° C. if not sufficiently isomerized, limiting its maximum concentration in cases where No. 1 fuel is targeted and preventing its direct use as a JP-8 jet fuel component. Therefore, the degree of isomerization and/or hydrocracking of heavier components is important for meeting both the cold properties and boiling point specifications. The cloud point of mixtures containing C18+ paraffins (which are isomerized) can be managed to be well below 0° F., attaining for example the desired −20 F cloud point required for winter use in North America if combined with a suitable proportion of branched alkanes in the C8 to C15 carbon number range.

Effective hydroisomerization conditions that can be used herein include temperatures from about 480° F. to about 750° F., preferably about 525° C. to about 660° F., pressures of from about 791 to about 20786 kPa (about 100 to about 3000 psig), preferably about 1480 to about 17338 kPa (about 200 to about 2500 psig), liquid hourly space velocities of from about 0.1 to about 10 $hr^{-1}$, preferably about 0.1 to about 5 $hr^{-1}$ and hydrogen treat gas rates from about 45 to about 1780 $m^3/m^3$ (about 250 to about 10000 scf/B), preferably about 89 to about 890 $m^3/m^3$ (about 500 to about 5000 scf/B The hydroisomerized stream is then sent to fractionation step 1100 where diesel boiling range hydrocarbons can be separated into a final product stream. The heavier liquid stream from Fischer Tropsch synthesis 600, indicated in line 20 of FIG. 1 hereof is sent to the hydrocracking/hydroisomerization step 900 where it is converted to distillate boiling range hydrocarbons with some hydroisomerization so as to have sufficient branching to satisfy the targeted fuel specifications. The C16+ alkanes derived from the triglycerides feedstock are preferably not taken through the hydrocracking unit to minimize yield loss.

The hydroprocessing (i.e. hydrotreating+hydrocracking) of the C16+ alkanes derived from triglycerides into diesel generally results in a substantially lower yield compared to hydroprocessing materials derived from Fischer-Tropsch with alkane carbon numbers in excess of C20. This is because of the cracking chemistry that splits molecules randomly and/or removes carbon groups greater than about 3 from initial hydrocarbon chains. Yield losses are inherent to the hydrocracking processing of n-alkanes, and is typically associated with secondary cracking in which additional C3+ carbons are removed from the main structure. With regard to triglycerides, after the primary cracking step (in which typically 3 or more carbon atoms are removed), secondary cracking can occur and lead to the loss of the entire molecule. When utilizing Fischer-Tropsch liquids in the C20+ range, secondary cracking can occur with a substantially lower yield loss due to the size of the feed molecule.

Hydrocracking/hydroisomerization catalysts are well known in the art and are typically molecular sieve containing catalysts, preferably zeolites or combinations of zeolites and amorphous aluminas. Preferred zeolites are 10 ring and uni-dimensional. Preferred zeolite/molecular sieves include ZSM-22, ZSM-23, ZSM-35, ZSM-48 and SAPO-11. Both hydrocracking and hydroisomerization catalysts are bifunctional catalysts, performing a dual dehydrogenation/hydrogenation (DHD/HD) function and an acidic function. The relative strength of these functions, coupled to morphological characteristics of the catalyst support, determines the extent to which a bi-functional catalyst can be cracking or isomerization selective, and whether lighter or heavier cracking products will be favored. The following metals are reported to be used as the DHD/HD function: noble metals (Pt, Pd), and non-noble transition metals from group VIA (Mo, W) and group VIIIA (Co, Ni). Transitions metals from group VIA and VIIIA are usually applied as sulfides (Ni—W, Ni—Mo, Co—Mo).

For low temperature Fischer-Tropsch wax hydrocracking, various acidic solids have been reported to formulate hydrocracking catalysts, including but not limiting to amorphous silica-alumina, silicated alumina, microcrystalline USY zeolite, microcrystalline USY zeolite and silica-alumina mixtures, chlorinated alumina. Long chain paraffins produced by a Fischer-Tropsch process can be upgraded to either high quality middle distillates or to high quality lubricant base oil using bifunctional catalysis. The conversion to medium distillates involves a hydrocracking process whereas the conversion to lube bases involves a selective hydroisomerization process. For both processes, bifunctional catalysts containing a (DHD/HD) function and an acidic function (Brönsted acidity) are needed. For selective Hydroisomerization, as well as for hydrocracking, the bifunctional catalyst needs to be ideal, meaning that the reactions taking place on the acid function should be the rate limiting steps of the reaction scheme. Therefore the use of a catalyst having a strong DHD/HD function is preferred. On the other hand, the optimal acidic function required for each kind of catalyst has to fulfill different requirements. The acidic phase should favor cracking towards isomerized middle distillates for a hydrocracking catalyst. In this case, the use of mesoporous solids having mild Brönsted acidity appears to be a preferred solution. The acidic phase should favour the isomerization of the long chain n-paraffins and minimize cracking reactions. Mono-dimensional 10 ring zeolites are preferred for selective hydroisomerization. Noble metal zeolite catalysts are preferred for n-paraffin Hydroisomerization with minimum cracking.

The effluent from hydrocracking/hydroisomerization 900 is then sent to the fractionation step 1100 to separate the material that satisfies the final product specifications and to recycle, via line 22, at least a portion of the unconverted heavy paraffins to the hydrocracking unit. The combination of producing excess hydrogen in the gasification step combined with the addition of a renewable triglyceride feed and the minimization/elimination of water usage, enhances the flexibility of site location and potential feed sources. For the diesel fuel case, a preferred site configuration involves producing a minimum of about 25 vol. % of the total liquid products through the Fischer-Tropsch process. This will provide a sufficient quantity of diesel range hydrocarbons in order to minimize efficiency losses associated with the hydrocracking of triglycerides. A maximum of about 75% of the total liquid products through Fischer-Tropsch is preferred in order to secure sufficient hydrogen for hydroprocessing the triglycerides.

Figure 2:
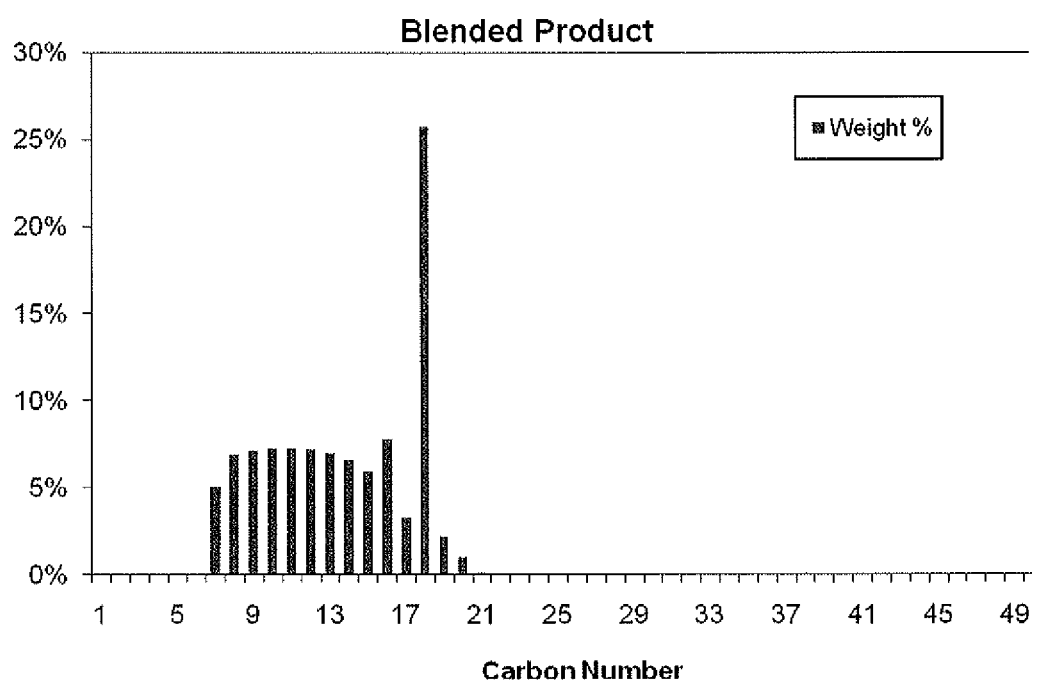
FIG. 2 hereof is an example of synthetic diesel fuel that can be typically produced via the co-processing of the two biomass sources of the present invention, namely RDF via which conversion to fuels entails gasification and Fischer-Tropsch synthesis, and yellow grease, an example of inedible fats and oils (IFO) which conversion via hydrotreating and hydroisomerization predominantly leads to C18 branched alkane. The tabular data is presented in the Table 1 hereof. The relative size of the C18 peak shown on FIG. 2 is dependent on the proportion of the carbon supplied from the IFO feedstock as opposed to the carbon derived from the RDF, and also on the selected design or operating condition for the fractionation unit. The product carbon distribution can thus be adjusted at will, by varying the ratio of the two feedstocks contribution to the final product, and also the selected cut point between diesel and the fractionator bottoms for recycling to the hydrocracking unit. This process flexibility allows for producing both light and heavier distillate fuels, for either winter or summer conditions, while maximizing the carbon efficiency of the overall process.

The co-processing of triglycerides and Fischer-Tropsch liquids offers significant unexpected yield advantages over separate processing. FIG. 2 hereof presents a graph showing an example for the weight fraction of each carbon number of the combined blend using a representative feed comprised of approximately 60% Fischer-Tropsch liquids and about 40% triglycerides derived from yellow grease hydrogenation. The cloud point of this combined blend can be adjusted to between about −10° to about −30° F. depending on the level of isomerization. The carbon numbers in this figure encompass only the C8+ hydrocarbons. The conversion of triglycerides to diesel or jet fuel will occur at about a 60%, or lower mass yield, due to the mass loss of oxygenates and propane, as well as hydrocracking compounds near the upper end of the product range. The Fischer-Tropsch synthesis products provide hydrocarbon feed both above and below the triglyceride-derived feed which can be converted to the desired product at much higher efficiencies. Hydrocracking/hydroisomerization yields for C20+ Fischer-Tropsch liquids are typically in the range of about 75 to about 80 wt %, significantly higher than the C16 to C22 alkanes derived from triglycerides. This is because the longer chains do not as readily over-crack to less than 8 carbon units. Consequently, more of the Fischer-Tropsch material remains in the desired product range.

Hydroisomerization yields are generally greater than about 90% for paraffinic feeds, which is significantly higher than cracking. Consequently when co-processing both materials, the mass of triglyceride derived hydrocarbons required for hydroisomerization and cracking is significantly less.

The following table presents speculative showing the carbon distribution of the expected product (RE) obtained by practice of the instant process compared to Fischer-Tropsch Diesel, #2 Diesel, diesel wherein only 5 wt. % is biodiesel (B-5), diesel wherein only 20 wt. % is biodiesel (B-20) and diesel which is 100 wt. % biodiesel.

TABLE 1

Carbon distributions for various diesel fuel blends (wt %).

| Carbon # | Re Diesel | FT Diesel | #2 Diesel | B-5 | B-20 | B-100 |
| --- | --- | --- | --- | --- | --- | --- |
| 7 | 3.83 | 0 | 0 | 0 | 0 | 0 |
| 8 | 4.49 | 0 | 0 | 0 | 0 | 0 |
| 9 | 4.70 | 0 | 1.42 | 1.35 | 1.14 | 0 |
| 10 | 4.82 | 6.70 | 3.04 | 2.89 | 2.43 | 0 |
| 11 | 4.88 | 12.60 | 4.56 | 4.33 | 3.65 | 0 |
| 12 | 4.88 | 10.80 | 6.37 | 6.05 | 5.10 | 0 |

TABLE 1-continued

Carbon distributions for various diesel fuel blends (wt %).

| Carbon # | Re Diesel | FT Diesel | #2 Diesel | B-5 | B-20 | B-100 |
|---|---|---|---|---|---|---|
| 13 | 4.78 | 1.50 | 7.55 | 7.17 | 6.04 | 0 |
| 14 | 4.63 | 12.40 | 9.31 | 8.84 | 7.45 | 0 |
| 15 | 4.05 | 19.00 | 10.29 | 9.77 | 8.23 | 0 |
| 16 | 9.57 | 9.40 | 11.22 | 11.16 | 10.98 | 10 |
| 17 | 3.17 | 2.70 | 10.49 | 9.96 | 8.39 | 0 |
| 18 | 39.25 | 6.80 | 29.00 | 32.05 | 41.20 | 90 |
| 19 | 2.56 | 5.10 | 8.82 | 8.38 | 7.06 | 0 |
| 20 | 2.08 | 3.50 | 7.20 | 6.84 | 5.76 | 0 |
| 21 | 1.28 | 4.10 | 5.83 | 5.54 | 4.66 | 0 |
| 22 | 0.49 | 2.10 | 3.14 | 2.98 | 2.51 | 0 |
| 23 | 0 | 0.40 | 1.08 | 1.02 | 0.86 | 0 |
| 24 | 0 | 1.50 | 0 | 0 | 0 | 0 |
| 25 | 0 | 0.40 | 0 | 0 | 0 | 0 |
| 26 | 0 | 0.80 | 0 | 0 | 0 | 0 |

What is claimed is:

1. A process for producing distillate transportation fuels from municipal solid waste and triglycerides, which process comprising:
   a) feeding a municipal solid waste stream comprised of inorganic material, organic material, and water to a treatment zone wherein it is converted to a refuse derived fuel by removing at least a portion of the inorganic material;
   b) conducting at least a portion of the refuse derived fuel to a drying zone wherein the level of water is adjusted to a level that will produce a syngas having a $H_2$ to CO ratio of about 2.0 to about 2.6 when the refuse derived fuel is gasified, and at least one contaminant;
   c) gasifying said refuse derived fuel to produce a syngas containing particulates and having a $H_2$ content and a CO content wherein the ratio of $H_2$ to CO is about 2.0 to about 2.6;
   d) treating said syngas to remove at least a portion of any particulates and at least one contaminant selected from the group consisting of $H_2S$, COS, HCl, $NH_3$, HCN, and Hg, thereby resulting in a cleaned syngas;
   e) passing said cleaned syngas to a hydrogen recovery zone wherein hydrogen in excess of the amount needed for downstream Fischer-Tropsch synthesis is removed, thereby resulting in a hydrogen depleted syngas stream;
   f) passing at least a portion of said hydrogen depleted syngas stream to a Fischer-Tropsch synthesis zone wherein it is reacted under Fischer-Tropsch reaction conditions and in the presence of a Fischer-Tropsch catalyst to produce a vapor phase stream, a light liquid stream comprised predominantly of hydrocarbons the carbon range of about C5 to about C20, and a heavy liquid stream comprised predominantly of hydrocarbons in the carbon range of about C8 to about C20+;
   g) separating the vapor stream from the liquid streams;
   h) combining said light liquid stream with a triglyceride stream and passing the combined stream to a hydrotreating zone wherein it is subjected to hydrotreating conditions in the presence of a hydrotreating catalyst to produce a hydrotreated liquid hydrocarbon stream substantially free of oxygenates and unsaturated bonds;
   i) passing the hydrotreated stream to a hydroisomerization zone wherein it is subjected to hydroisomerization conditions in the presence of an hydroisomerization catalyst thereby resulting in an isomerized hydrotreated stream containing substantially more branched compounds than the hydrotreated stream before hydroisomerization;
   j) passing said heavy Fischer-Tropsch liquid stream from the synthesis zone to a hydrocracking zone wherein it is subjected to hydrocracking conditions in the presence of a hydrocracking catalyst, to produce a lower boiling product stream boiling primarily in the distillate boiling range;
   k) co-feeding the product streams from the hydrocracking zone and the hydroisomerization zone into a common fractionating zone, to produce at least two predetermined fractions one of which is a distillate boiling range transportation fuel stream.

2. The process of claim 1 wherein substantially all of the inorganic material is removed from the municipal solid waste during step a).

3. The process of claim 1 wherein the level of water remaining after drying step b) is from about 5 to about 20 wt. % based on the total weight of the refuse derived fuel.

4. The process of claim 1 wherein the catalyst used in the Fischer-Tropsch synthesis step f) is a cobalt-containing catalyst.

5. The process of claim 1 wherein the Fischer-Tropsch conditions include temperatures of about 380° F. to about 440° F. and total pressures of about 350 to about 550 psig.

6. The process of claim 5 wherein the Fischer-Tropsch synthesis is conducted in a fixed bed type reactor.

7. The process of claim 5 wherein the Fischer-Tropsch synthesis is conducted in two stages.

8. The process of claim 1 wherein the triglyceride feed is from a source selected from the group consisting of rape seed, soybean, cotton seed, safflower seed, castor bean, olive, coconut, palm, corn, canola, Jatropha, rice bran, tobacco seed, fats and oils from animals, including from rendering plants and fish oils, algae derived oils, and yellow grease.

9. The process of claim 1 wherein the catalyst used hydrotreating step is comprised of at least one Group 8 metal and at least one Group 6 metal on a refractory oxide support.

10. The process of claim 9 wherein the Group 8 metal is selected from the group consisting of Ni and Co.

11. The process of claim 10 wherein the Group 6 metal is selected from the group consisting of W and Mo.

12. The process of claim 1 wherein the hydrotreating catalyst is comprised of at least one noble metal selected from the group consisting of Pt and Pd on a refractory oxide support.

13. The process of claim 9 wherein the hydrotreating conditions of step h) include temperatures from about 280° C. to about 400° C. and pressures from about 200 to about 3000 psig.

14. The process of claim 13 wherein the hydrotreating is performed in a fixed bed reactor.

15. The process of claim 1 wherein the hydroisomerization of step i) is performed at conditions that include temperatures of about 250° C. to about 400° C. and pressures of about 100 to about 3000 psig.

16. The process of claim 1 wherein the hydrocracking catalyst is selected from molecular sieve and zeolite catalyst.

17. The process of claim 15 wherein the hydrocracking catalyst is selected from the group consisting of ZSM-22, ZSM-23, ZSM-35, ZSM-48 and SAPO-11, gamma-alumina or combination of the said zeolites and amorphous alumina supports, whereby the hydrogenating function is provided by either a noble metal or a combination of base metals selected from the group consisting of Co—Mo, Ni—Mo and Ni—W.

* * * * *